A. H. O'BRIEN.
SUPPORT FOR TWO-WHEELED VEHICLES.
APPLICATION FILED AUG. 16, 1911.
1,044,232.
Patented Nov. 12, 1912.
3 SHEETS—SHEET 1.
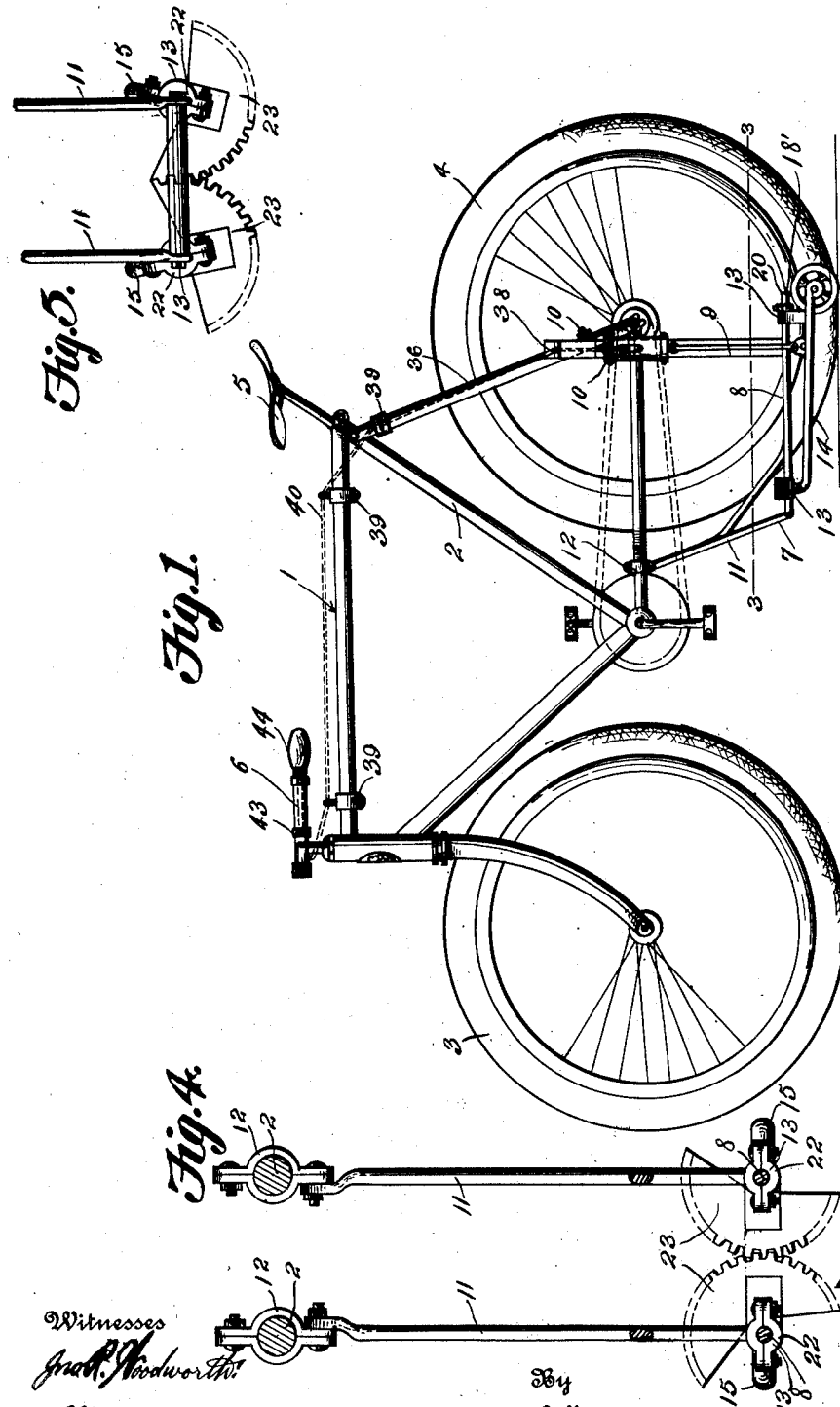

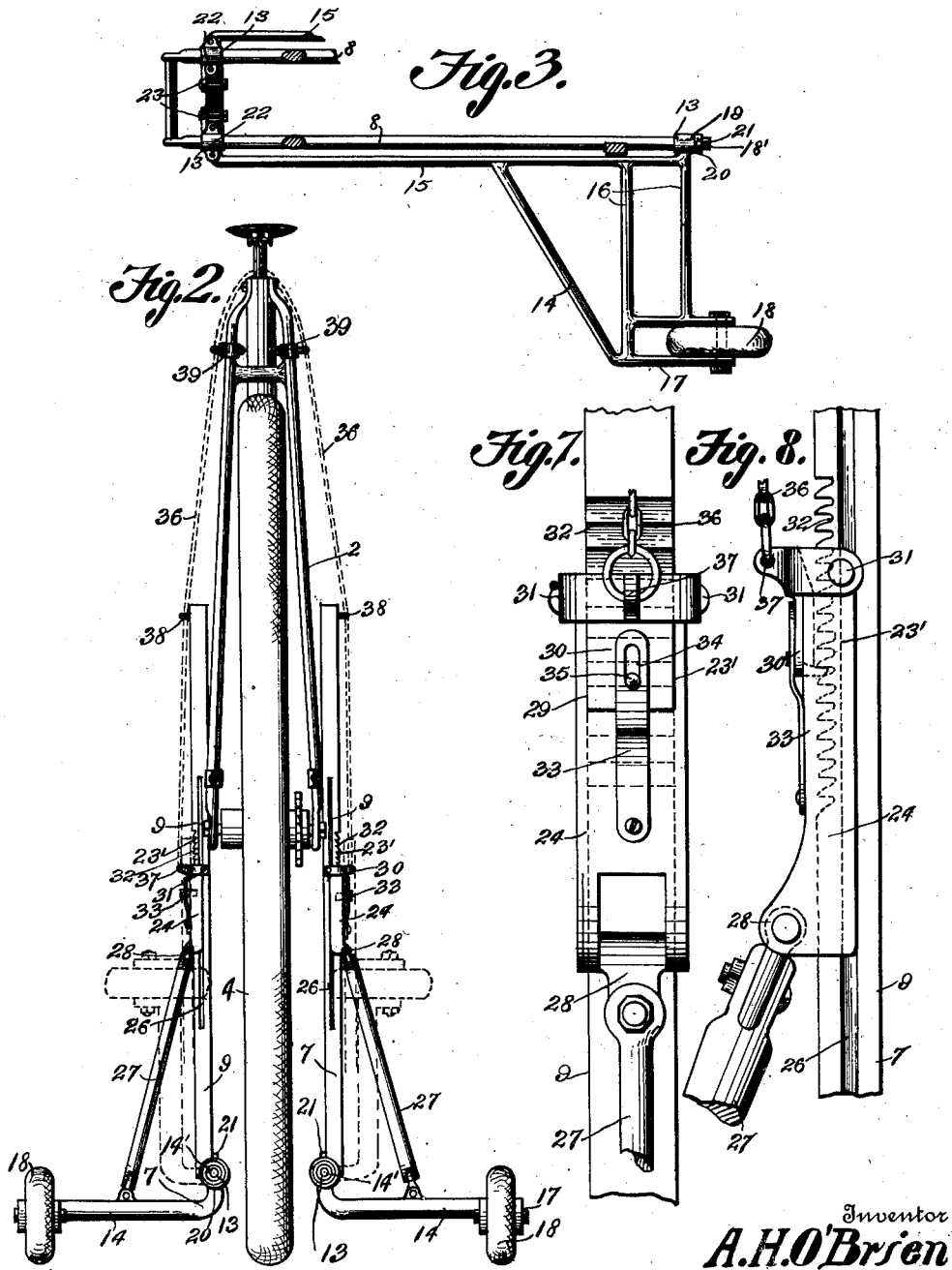

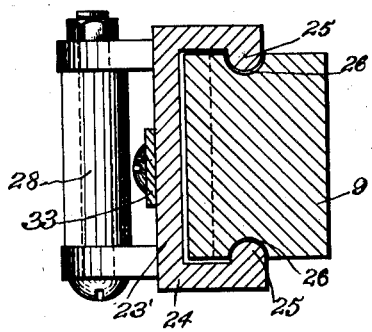
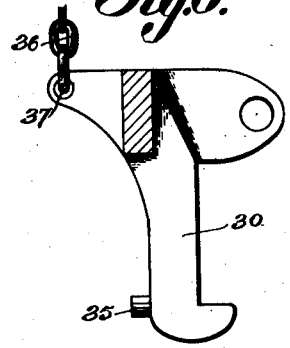
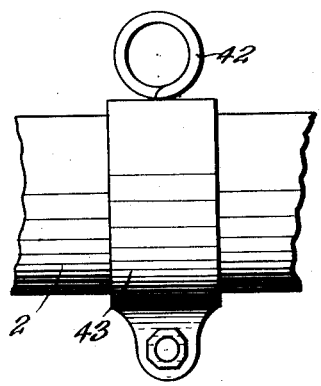
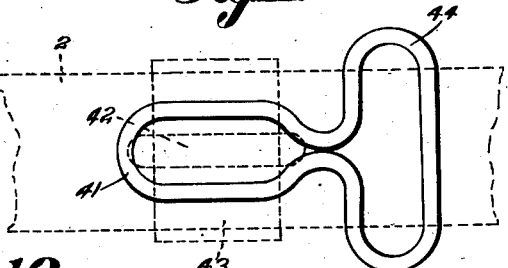
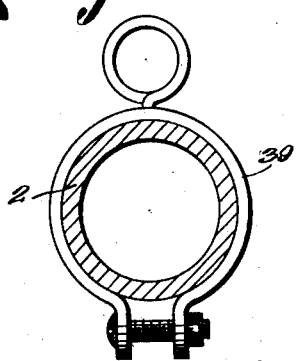

UNITED STATES PATENT OFFICE.

ARTHUR H. O'BRIEN, OF DENVER, COLORADO.

SUPPORT FOR TWO-WHEELED VEHICLES.

1,044,232.

Specification of Letters Patent.

Patented Nov. 12, 1912.

Application filed August 16, 1911. Serial No. 644,461.

*To all whom it may concern:*

Be it known that I, ARTHUR H. O'BRIEN, a citizen of the United States, residing at Denver, in the county of Denver and State of Colorado, have invented certain new and useful Improvements in Supports for Two-Wheeled Vehicles; and I do hereby declare the following to be a full, clear, and exact description of the invention, such as will enable others skilled in the art to which it appertains to make and use the same.

My invention relates to attachments for bicycles, motorcycles, or other two-wheeled conveyances in which the wheels are used tandem, such attachments being designed as a support for the vehicle when not in use, to prevent the same from tipping over, and when in use to serve as an aid to the beginner in retaining the vehicle in an upright position while in motion, thereby assisting the rider to maintain his balance.

The object of my invention is to provide a support which may be detachably secured to a bicycle, motorcycle or the like, and which may be conveniently operated by the rider when the vehicle is in motion.

Another object is to provide a support, as hereinafter described, that will not only support the vehicle in a vertical position, but will support the driving wheel from the ground when the vehicle is not in use.

This invention is especially designed for use on motorcycles, where the operator, by supporting the drive wheel from the surface and allowing free play thereof, will be enabled to test his motor.

With these and other objects in view, my invention consists of the novel construction and arrangement of parts as will be hereinafter fully described and claimed.

In the drawing—Figure 1 is a side elevation of a bicycle with my improved support applied; Fig. 2 is a rear elevation of the same, showing the support raised, in dotted position; Fig. 3 is a section on the line 3—3 of Fig. 1, omitting the bicycle, and Figs. 4, 5, 6, 7, 8, 9, 10, 11 and 12 are enlarged detail views.

Referring now more particularly to the drawings, 1 designates a bicycle, consisting of a frame 2, front wheel 3, rear driving wheel 4, seat 5 and handle bars 6, all of which may be of the usual construction. Detachably secured to each side of the frame 2 of the vehicle are brackets 7. Each of the brackets comprises a longitudinally extending member 8, and a vertical member 9, having the lower terminal thereof secured to the rear end of said horizontal member 8 and its upper terminal attached to the frame 2 of the vehicle by means of the screw collars or clamps 10. The opposite end of the longitudinal member 8 is connected to a forked member 11, the opposite end of the said forked member being connected to the frame 2 by means of screw collars or clamps 12.

Pivotally secured to the bracket 7, as at 13, are supports 14. These supports consist of a longitudinal member 15 and transverse members 16, terminating in a forked portion, as at 17, to form a bearing for the wheel 18.

One end of the longitudinal member 8 is reduced, as at 18', to receive a bearing 19 of the longitudinal member 15. This bearing is held in place by a collar 20, which may be adjusted by means of screws 21. On the opposite end of the longitudinal member 8 is another reduced portion, to receive a clamp or bearing 22 formed on the longitudinal member 15. Extending from the clamp 22 is a forked member, countersunk in the sides of a semi-circular toothed sector 23.

A ratchet or locking device 23' is formed on the vertical member 9 of the bracket 7. This locking device consists of a sleeve 24, having inwardly extending tongues 25 sliding in grooves 26 formed on each side of the vertical member 9. The lower portion of the sleeve 24 is connected to a coupling rod 27 by means of a swivel joint 28, and the opposite end of the coupling rod is pivotally connected to the transverse member of the support 14. The upper portion of the sleeve 24 is cut away, as at 29, to receive a pawl 30, the said pawl being pivotally connected, as at 31, to the sides of the sleeve 24, and the lower portion engaging notches 32 formed on the front face of the member 9. A leaf spring 33 is riveted to the sleeve 24, and has a slot 34, in which slides a lug 35 formed on the pawl 30. This spring normally holds the pawl 30 in engagement with the notches 32. A chain 36 is connected to an ear 37 formed on the pawl 30 to throw the said pawl out of engagement with the notches 32, and also for raising and lowering the supports 14. This chain 36 extends from each of the pawls 30 up through an eye 38 formed adjacent the upper end of the vertical member 9 and then through eyes formed on screw collars or clamps 39 mounted on the frame 2 of the bicycle. These chains terminate in a single chain, as at 40, which has a hook 41 on one end engaging lugs 42 formed on screw collars or clamps 43 mounted on the handle bars 6 of the bicycle. There being two of these clamps 43, one as at 44, to hold the support in a vertical position, as shown in dotted lines in Fig. 2 of the drawings, and the other clamp 43 to hold the hook 41 when the supports are in lowered position.

To lower the supports, all that is necessary is to release the hook 41 from the lugs 42, and the supports will drop of their own weight. The supports descend until the wheels come in contact with the surface, and if the bicycle is inclined to one side, the wheel of the support on that side will naturally strike the surface first, and the wheel on the opposite side will remain suspended and will not lower until the cycle starts to move back to a vertical position, because of the action of the two semi-circular toothed sectors 23 not allowing one support to move without the other moving in the same direction. If the cycle is in a vertical position when the supports are released, they will come in contact with the surface, and will support the cycle in that position, and by the action of the pawls engaging the notches on the vertical member 9, will resist any chance of the support sliding up again until the pawls are released by the chains 36. By lifting the rear driving wheel from the surface and releasing the supports the pawls will engage the lower notches of the vertical member 9, and upon the lowering of the drive wheel, the support will hold the same from the surface, thereby allowing the drive wheel to rotate.

Having described my invention, what I claim and desire to secure by Letters Patent is:

1. A support for bicycles and the like, brackets detachably secured on each side of the frame of the vehicle, supports pivotally secured to said brackets, a sleeve slidably mounted on each of said brackets, a spring pressed pawl pivotally secured to said sleeve to engage notches formed on said bracket, one end of said sleeve being connected to one of said supports, and means on its opposite end for raising and lowering the said support, substantially as described.

2. A support for bicycles and the like, brackets detachably secured to each side of the frame of the vehicle, supports pivotally secured to said brackets, semi-circular inter-engaging toothed sectors formed at one end of the said supports, a sleeve slidably mounted on each of said brackets, a pawl pivotally secured to said sleeve to engage notches formed on said brackets, one end of said sleeve being connected to one of the supports, and a chain connected to its opposite end, and means on the end of said chain to hold the supports in a raised position, substantially as described.

3. The combination with a vehicle, of a plurality of brackets secured thereto, a support pivoted to each bracket, a sleeve mounted for reciprocation on each bracket, a connection between said sleeve and the coöperating support, and means whereby said sleeves may be retained from movement.

4. The combination with a vehicle, of a plurality of brackets secured thereto, a support pivoted to each bracket, a sleeve mounted for reciprocation on each bracket, a connection between said sleeve and the coöperating support, means whereby said sleeves may be retained from movement, and means whereby a movement of one support may impart a similar movement to the remaining support.

5. The combination with a vehicle, of a plurality of brackets secured thereto, a support pivoted to each bracket, sleeves mounted for reciprocation on said brackets, connections between said sleeves and said supports, and a ratchet and pawl connection between each sleeve and its coöperative bracket.

6. The combination with a vehicle, of a plurality of brackets secured thereto, a support pivoted to each bracket, sleeves mounted for reciprocation on said brackets, connections between said sleeves and said supports, means for locking said supports from movement, and inter-engaging sectors operated by said supports to create a simultaneous movement thereof.

In testimony whereof I affix my signature in presence of two witnesses.

ARTHUR H. O'BRIEN.

Witnesses:
 MAY HAYS,
 M. B. BRUNER.